H. H. BRIGGS.
TONGUE-SUPPORT.
No. 170,434. Patented Nov. 30, 1875.
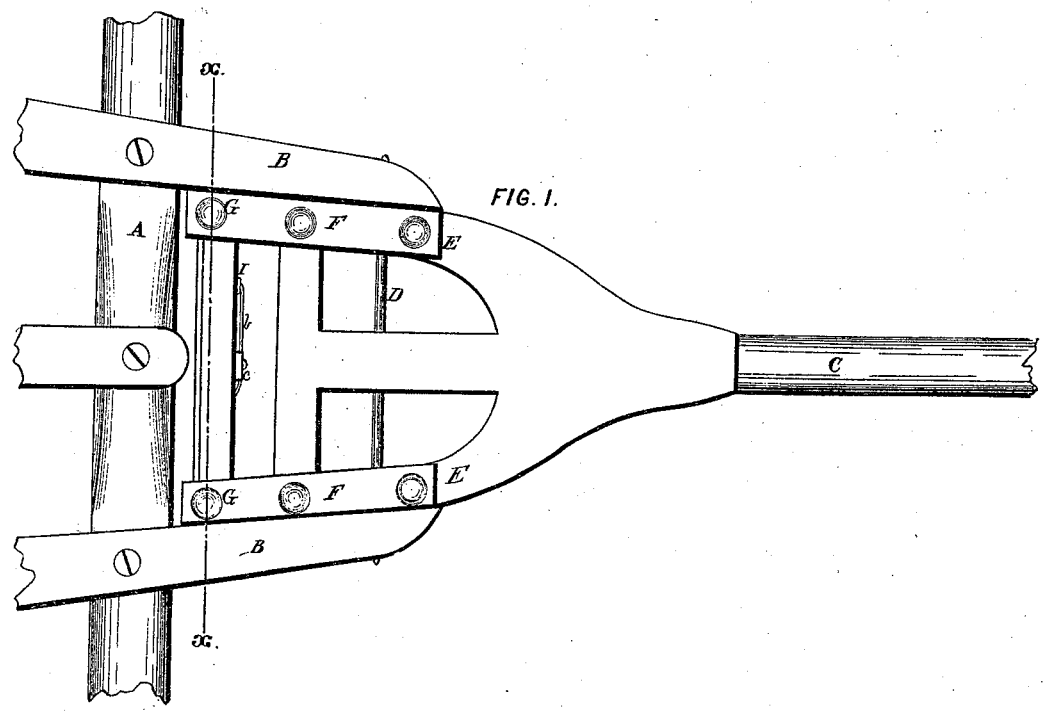
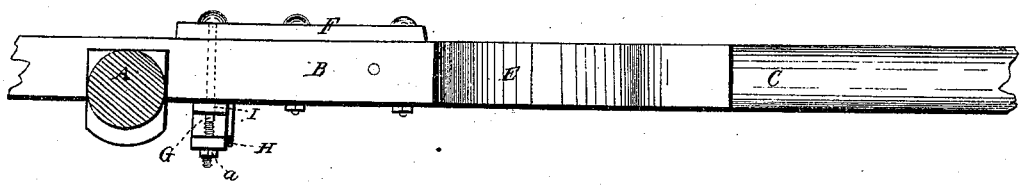
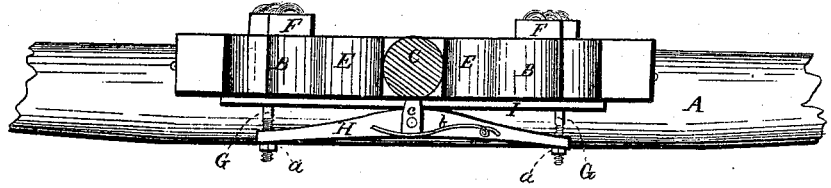
WITNESSES. INVENTOR.

UNITED STATES PATENT OFFICE.

HENRY H. BRIGGS, OF OLMSTED, OHIO.

IMPROVEMENT IN TONGUE-SUPPORTS.

Specification forming part of Letters Patent No. 170,434, dated November 30, 1875; application filed August 4, 1875.

*To all whom it may concern:*

Be it known that I, HENRY H. BRIGGS, of Olmsted, in the county of Cuyahoga and State of Ohio, have invented a certain new and Improved Wagon-Tongue Supporter; and I do hereby declare that the following is a full, clear, and complete description thereof, reference being had to the accompanying drawings making part of the same.

Figure 1 is a top view of a wagon-tongue and hounds, having attached thereto the supporter. Fig. 2 is a side view of Fig. 1. Fig. 3 is an end view of the same; and Fig. 4, a section through line *x x*, Fig. 1.

Like letters of reference refer to like parts in the several views.

The object of this invention is to support the tongue of a wagon in a horizontal position, or nearly so, thereby relieving the necks of the team from bearing the weight of the outer end of the tongue.

In the drawing, A represents a section of the axle-tree of a wagon, having attached thereto the hounds B, between which the tongue C of the wagon is fitted, and therein secured by a bolt, D, all of which is or may be constructed like that of ordinary wagons. In such wagons the outer end of the tongue is supported by the necks of the team, to which it is secured by the neck-yoke and strap attached to the horses' collars. To relieve the team from carrying this end of the tongue, I extend the hounds E of the tongue back near to the axle-tree by means of extension-pieces F, bolted to the upper side of the hounds. Through the end of each of the pieces F passes a bolt, G, whereby is suspended a bar, H, Fig. 3, through the ends of which the bolts pass, and which is prevented from dropping therefrom by the nuts *a*. The length of the bar is a little less than the distance between the hounds, so that it may pass between them if need be. I is a spring laid upon the top of the bar, and which is prevented from falling forward therefrom by a button, *c*, held in a vertical position for that purpose by a spring, *b*. The spring I is prevented from falling backward from the bar by the bolts G referred to, which are received in notches cut in the edge of the spring. Said notches also prevent the spring from slipping sidewise from the bar. The length of the spring is such as to extend under the hounds B, as will be seen in Fig. 3.

It will be readily perceived that by this application of the spring to the under side of the tongue, to which it is attached by the bolts, the tongue will be held extended in a horizontal position, or nearly so, as shown in Fig. 2, the weight of the tongue being sustained by the spring and bar, thereby relieving the team therefrom.

It will be seen that the bar is thicker through the middle than at the ends. This is to allow the movement of the spring, and thereby permit some vertical movement of the tongue on passing over rough ground. The tongue may be permitted to drop on the ground by removing the spring. For that purpose the button must be turned down, which will allow the spring to be removed. The elevation of the tongue can be adjusted to horses of different heights by means of the nuts *a*.

What I claim as my invention, and desire to secure by Letters Patent, is—

In combination with the tongue C and hounds B of a wagon, the bar H, spring I, bolts G, button *c*, and spring *b*, in the manner as described, and for the purpose set forth.

HENRY H. BRIGGS.

Witnesses:
 W. H. BURRIDGE,
 A. F. CORNELL.